United States Patent [19]
Dillon

[11] 3,766,031
[45] Oct. 16, 1973

[54] PROCESS FOR NON-DESTRUCTIVE RADIATION DEGRADATION OF POLYTETRAFLUOROETHYLENE

[75] Inventor: Joseph A. Dillon, Huntingdon Valley, Pa.

[73] Assignee: Garlock, Inc., Palmyra, N.Y.

[22] Filed: Apr. 10, 1972

[21] Appl. No.: 242,864

Related U.S. Application Data
[63] Continuation of Ser. No. 39,894, May 22, 1970.

[52] U.S. Cl. .............................. 204/159.2, 260/92.1
[51] Int. Cl. ........................... C08d 1/00, C08f 1/16
[58] Field of Search ............................... 204/159.2; 260/29.6 F, 92.1

[56] References Cited
UNITED STATES PATENTS
2,936,301    5/1960    Thomas et al. .................... 260/92.1

FOREIGN PATENTS OR APPLICATIONS
829,503    3/1960    Great Britain

OTHER PUBLICATIONS
Ryan, Radiation of Polytetrafluoroethylene, Modern Plastics, Vol. 31, p. 152 (1954).

Chapiro, Radiation Chemistry of Polymeric Systems, J. Wiley & Sons, New York, pp. 526–533, (1962).

*Primary Examiner*—John C. Bleutge
*Assistant Examiner*—Richard B. Turer
*Attorney*—E. Arthur Thompson

[57] ABSTRACT

Solid polytetrafluoroethylene, sintered or unsintered, is degraded non-destructively by irradiation at a dosage level in the range of from about 5 megarads to about 25 megarads. The irradiated polytetrafluoroethylene is readily comminuted and exhibits the characteristic low coeffiecint of friction of polytetrafluoroethylene.

3 Claims, No Drawings

PROCESS FOR NON-DESTRUCTIVE RADIATION DEGRADATION OF POLYTETRAFLUOROETHYLENE

This is a X Continuation, of application Ser. No. 39,894 filed May 22, 1970 now abandoned.

BACKGROUND OF THE INVENTION

1. Field of the Invention

This invention relates to a process for rendering solid polytetrafluoroethylene readily comminutable, and the product of such process.

2. Description of the Prior Art

Polytetrafluoroethylene is a white thermoplastic powder having a melting point of 621°F. This material is characterized by high service temperature, chemical inertness, excellent electrical properties and a low coefficient of friction. However, as supplied by the manufacturer this material tends to agglomerate, and must be sintered at at least 621°F during fabrication. For example, Type 7 polytetrafluoroethylene powder is generally preformed under pressure into a desired shape, and free sintered in an oven normally at a temperature in the range of from about 700°F to about 750°F. Type 1, 5 and 9 powders are preformed under pressure and sintered under pressure normally at a temperature in the range of from about 650°F to about 750°F. Type 6 powder is blended with a lubricant such as naphtha or the like, preformed, extruded into a desired shape under high pressure, lubricant evaporated and then sintered normally at a temperature in the range of from about 700°F to about 1,200°F. None of these sintered materials can be readily comminuted into fine particles. For example, sintered polytetrafluoroethylene can only be reduced by high impact pulverization to the size range of from 100 to 200 mesh (149 to 74 microns), and this accomplished only with the associated use of coolants such as liquid carbon dioxide or liquid nitrogen.

U. S. Pat. No. 3,432,511 describes a process of degrading sintered and unsintered polytetrafluoroethylene, involving heating the polymer to a temperature above the normal sintering range thereof, and as high as 880°F. Since special ventilation procedures are required whenever polytetrafluoroethylene is heated above 400°F, and since temperatures above the sintering range may cause discoloration of the normally white material, it is desirable to provide a method for degrading sintered and unsintered polytetrafluoroethylene without the application of heat, whereby a finely divided particulate polytetrafluoroethylene may be produced which is readily dispersible and does not tend to agglomerate.

SUMMARY OF THE INVENTION

It has now been unexpectedly discovered that the application of a critical dose of ionizing radiation to sintered or unsintered polytetrafluoroethylene renders such material capable of being comminuted to microfineness with no adverse heat side effects, and the resulting particles are readily dispersible in diverse media. Such particles possess the extremely low coefficient of friction associated with polytetrafluoroethylene resin. The dosage level of ionizing radiation in accordance with the process of this invention lies within the range of from about 5 megarads to about 25 megarads, and is preferably maintained between about 10 megarads and 25 megarads.

DESCRIPTION OF THE PREFERRED EMBODIMENTS

In the following examples, solid unsintered and sintered scrap polytetrafluoroethylene samples are exposed to the ionizing radiation of a three million volt Van de Graff accelerator for the time period indicated, giving the indicated dose. The samples are then comminuted to yield the corresponding sized particles. (The sintered sample is reduced to one-eighth inch to one-sixteenth inch pieces before radiation).

| Example | Polytetra-fluoro-ethylene | Contact Time (sec.) | Dosage (mega-rads) | Average Particle Size[1] (Microns) |
|---|---|---|---|---|
| 1 | Unsintered | 2.5 | 5 | 11.1 |
| 2 | Unsintered | 5.0 | 10 | 5.3 |
| 3 | Unsintered | 7.5 | 15 | 2.5 |
| 4 | Unsintered | 10.0 | 20 | 1.5 |
| 5 | Sintered scrap | 12.5 | 25 | 0.90 |

[1]By Fisher Sub Sieve Sizer — ASTM B-330

During the processing in accordance with Examples 1–5, the temperature of the polytetrafluoroethylene does not rise above about 250°F, and there is virtually no discoloration of the product. All such products have the following typical properties:

Color - White or gray
Bulk density - 25 lbs/ft (D-1457-62T)
Specific gravity - 2.10–2.15 (D-792-60T)
Hardness (Durometer D) 50-65 (D-1706-59T)
Coefficient of Linear Expansion
Per °F. 73°F. $5.5 \times 10^5$in. (D-696-44)
Dielectric Strength 500–1500 V/mil (D-149-55T)
Water Absorption None (D-570-54T)
Flammability Non-flammable (D-635-56T)
Static or Kinetic
Coeff. of Friction 0.04 - 0.15
Melting Point 610°–621°F

Having thus described my invention, I claim:

1. In a process for producing microfine polytetrafluoroethylene powder which is readily dispersible and has a coefficient of friction in the range of from 0.04 to 0.15, the steps which comprise:
   1. exposing a sintered polytetrafluoroethylene, which can not be readily comminuted, to ionizing radiation at a dosage level within the range of from about 5 megarads to about 25 megarads, whereby the temperature of the exposed compound is maintained below about 250°F during said exposure,
   2. comminuting the product of step (1), and
   3. recovering as a product microfine polytetrafluoroethylene which has a coefficient of friction in the range of from 0.04 to 0.15.

2. The process of claim 1 wherein the dosage level is within the range of from about 10 megarads to about 25 megarads.

3. The product of the process of claim 1.

* * * * *